UNITED STATES PATENT OFFICE.

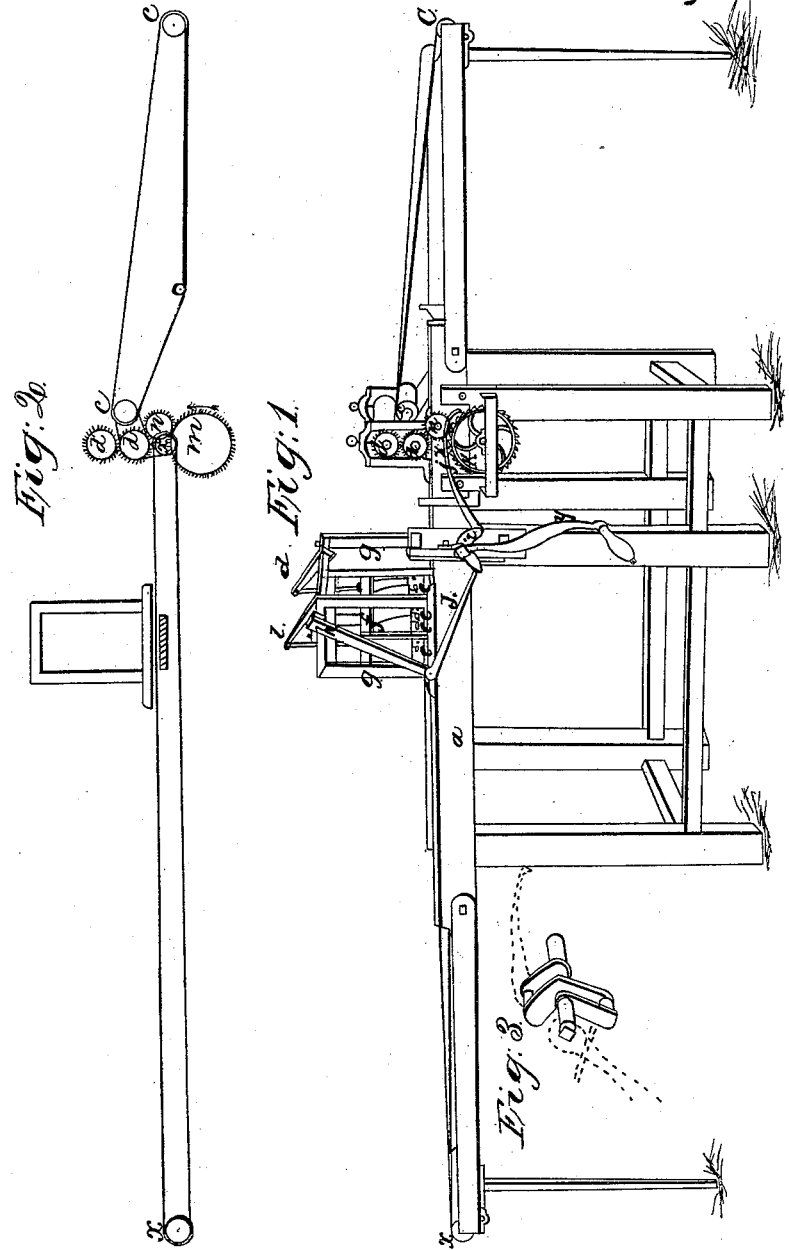

RILEY DARLING, OF EAST GREENWICH, RHODE ISLAND.

MACHINE FOR MAKING CRACKERS.

Specification of Letters Patent No. 2,277, dated September 30, 1841.

*To all whom it may concern:*

Be it known that I, RILEY DARLING, of East Greenwich, in the county of Kent, State of Rhode Island, and Providence Plantations, have invented a new and useful Machine for Rolling and Cutting Crackers and entitled a "Machine for Making Crackers;" and I do hereby declare that the following is a full, clear, and exact description of the construction and operation of the same, reference being had to the annexed drawings, making a part of this specification, in which—

Figure 1 is a perspective view. Fig. 2 a longitudinal elevation.

This machine consists of a frame, $a$, made of four inch joists six feet long one and eleven-twelfths feet wide, and three feet high, to each end of which frame, $a$, is attached by a hinge joint, pieces of plank or joist three feet in length. These rise and fall, and when raised are supported by legs, also hung on hinges, and thus make the entire length of the machine twelve feet.

The motion necessary for the operation of the machine is created in the following manner: Two and four-twelfths feet from the head of the frame $a$, upon one of its legs is a double crank, $y$, with two sweeps $i$ and $i'$, nearly at right angles with each other. From the sweep, $i$, proceeds a lever, $j$, on the end of which is a lip or hook, which reaches over on to the ratchet wheel, $k$, which is nine inches in diameter. The cog wheel $m$, as represented in Fig. 2, is situated directly back of the ratchet wheel $k$, is of the same diameter, and turns on the same axis, the cogs of it work into the cogs of the wheel, $n$, the cogs of $n$, into cogs of $d$, and cogs of $d$, into cogs of $d'$, above it. All these wheels are outside of the frame, $a$, and the wheels $d$, $d'$ are each four inches in diameter, the wheel $n$, is three inches in diameter, in connection with wheels $d$ and $d'$ and turning on same axes, are two rollers, each four inches in diameter, extending across the frame $a$, and supported above it by the uprights as represented in Fig. 1. C and $c$ represent two other rollers each three inches in diameter extending across frame, $a$, C at the right hand extremity of the machine, $c$, projected a little in front of the rollers, turning on axes of wheels $d$, $d'$, and its axis supported in a beam attached to one of the posts on each side of the upright, and with its upper edge a little above the upper edge of the lower roller, $d$, as seen in Fig. 1. C, $c$, are connected by an apron of cloth as seen in Fig. 2, the motion of which is there indicated by an arrow. When the crank $y$, is turned, the sweep $i$ and lever $j$, which reach over the ratchet wheel $k$, cause that wheel to revolve, and consequently the wheel, $m$, which turns on the same axis. This communicates its motion by means of its cogs, to the wheel $n$, $n$, by its cogs to wheel $d$, and the roller turning on its axis, and wheel $d$ communicates its motion by its cogs to the wheel $d'$ above it, and the roller turning on the axis of the wheel $d'$, as seen in Fig. 2. This motion is transmitted to the rollers C, and $c$, and apron connecting them, by a band from $d$, to $c$, as represented in Fig. 2. The dough of the desired consistency is placed on the apron at any point between C, and $c$, and by the above motion is carried toward and over roller, $c$, and directly between rollers turning on axes of wheels $d$, and $d'$, by which it is rolled out of the proper thickness, and acquires a smooth surface. From between these rollers and in this state it falls on another apron which passes over and around rollers $x$ and $x'$ both three inches in diameter. These rollers $x$ and $x'$ and apron connecting them receive their motion by a band from lower wheel $d$, as seen in Fig. 2.

Three feet from the head of the permanent frame $a$, and upon and across it, is raised a frame work $g$, $g$. On the top of this is a crank $h$, the shaft running across the frame work $g$, $g$. From this and near its ends, two stubs $l$, $l$, run out and are attached to the cross bar $f$, the cross bar $f$, is made of hard wood, three inches wide, one and one-half inch thick and slides in a groove in the posts of the frame work $g$, $g$.

Attached to the lower side of cross bar $f$, are four metal wings $e$, $e$, $e$, $e$, for the purpose of cutting the dough. A coil of wire passes down through each of these rings, the rings sliding by it, to prevent the dough when cut by the rings, from adhering to, and rising with them. The crank $y$, being put in motion communicates by means of sweep $i'$, and lever $j'$, a rising and falling motion to the cross bar $f$. Under the rings $e$, $e$, $e$, $e$, and between the two sides of apron passing over rollers $x$ and $x'$ is a board across frame, $a$, to cut upon. The dough having been prepared for cutting, and having fallen on this last apron, as already described, is carried along upon it under the cutters e, e, e, e, is cut, and carried along to the left hand end of the machine ready for baking. The shape and size of these cutters, may be varied as desired, and any stamp inserted.

Fig. 3 is a clear and exact drawing of the crank, y, sweeps i and i'. Its operation has been already described.

I do not claim as of my invention the construction of the parts for rolling the dough and cutting the crackers nor do I claim simply the combination of the two; but What I do claim as my invention and desire to secure by Letters Patent is—

The manner herein described of combining the operation of the two by means of the double crank in combination with the connecting rod j', and pendulous lever h, attached to the cutting part, and the hands, i, and ratchet wheel k, attached to the rolling part, all as herein described.

RILEY DARLING.

Witnesses:
LODOWICK W. UPDIKE,
JOHN BROWN.